United States Patent [19]

Akashi et al.

[11] Patent Number: 5,303,939
[45] Date of Patent: Apr. 19, 1994

[54] APPARATUS FOR AND METHOD OF PICKING UP FLEXIBLE DISK CENTER HUB

[75] Inventors: Tsutomu Akashi; Shuichi Imada, both of Tochigi, Japan

[73] Assignee: Kao Corporation, Tokyo, Japan

[21] Appl. No.: 903,860

[22] Filed: Jun. 25, 1992

[30] Foreign Application Priority Data

Jun. 26, 1991 [JP] Japan .................................. 3-154948

[51] Int. Cl.$^5$ ................................................ B23B 5/22
[52] U.S. Cl. ...................... 279/158; 279/2.12; 279/128; 279/133
[58] Field of Search ........... 269/48.1; 279/2.11, 279/2.12, 128, 133

[56] References Cited

U.S. PATENT DOCUMENTS

| | | | |
|---|---|---|---|
| 2,812,185 | 11/1957 | Snell | 279/128 |
| 2,819,905 | 1/1958 | Stead | 279/128 |
| 2,877,022 | 3/1959 | Parker et al. | 279/2.11 X |
| 2,922,933 | 1/1960 | Mouer et al. | 279/128 X |
| 3,893,676 | 7/1975 | Gloshinski et al. | 279/128 |

FOREIGN PATENT DOCUMENTS 4-45382 4/1992 Japan .

Primary Examiner—Timothy V. Eley
Attorney, Agent, or Firm—Nils H. Ljungman & Associates

[57] ABSTRACT

The present invention relates to an apparatus for and method of picking-up a center hub used with a flexible disk at a step of fixing the center hub and flexible disk to each other or at a similar step in the flexible disk cartridge manufacturing process. The spindle is lowered toward the center hub until the centering pin provided at the end thereof is projected into the central hole in the central portion of the center hub for centering. Next, the collet chuck is lowered until the end claws thereof are projected into the concavity in the central portion of the center hub. At this time, the flange portion of the center hub is raised due to as attraction exerted thereon by the magnets buried in the outer end face portion of the collet chuck other than at the end claws. Then the spindle is lifted, and the opening mechanism opens the collet chuck, the end claws of which will be, in turn, pressed toward the circumferential wall of the concavity in the central portion of the center hub, whereby the center hub is held in a required position.

1 Claim, 8 Drawing Sheets

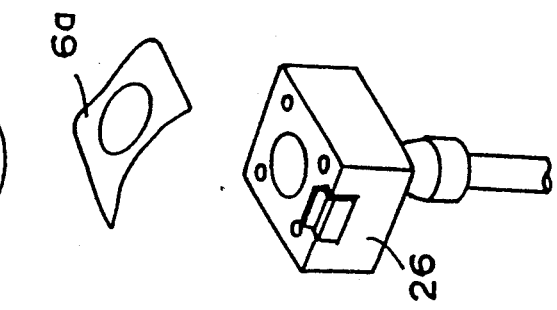
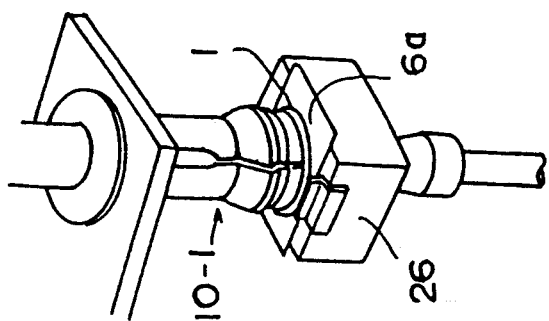
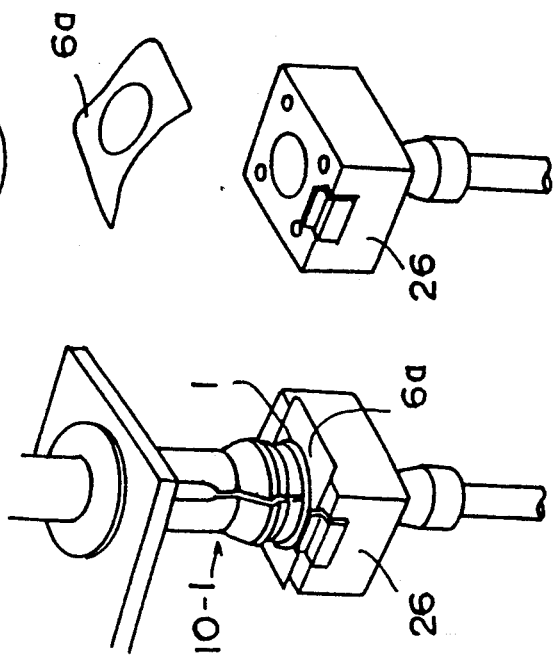
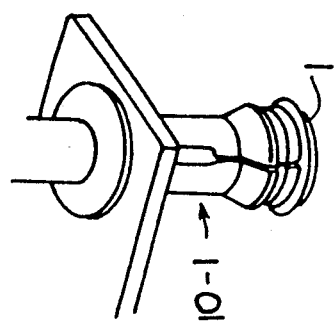
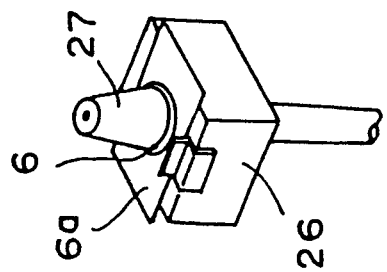
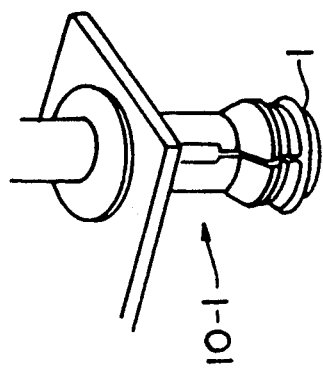
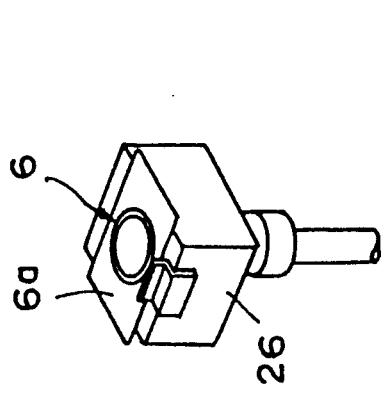

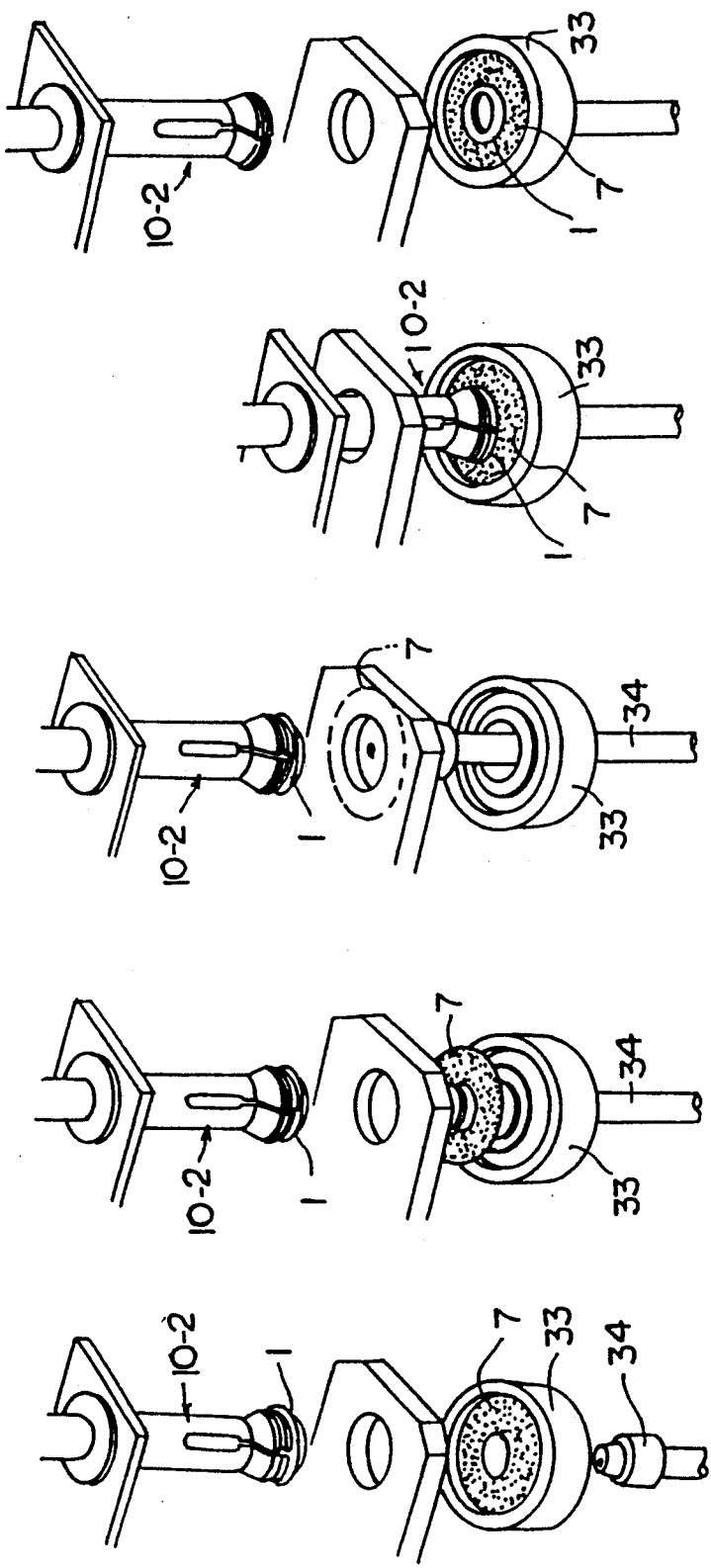

APPARATUS FOR AND METHOD OF PICKING UP FLEXIBLE DISK CENTER HUB

BACKGROUND OF THE INVENTION (1) Field of the Invention

The present invention relates to an apparatus for and method of picking-up a center hub used with a flexible disk, at a step of fixing the center hub and flexible disk to each other, or at a similar step in the assembly of the flexible disk cartridge manufacturing process.

(2) Description of the Related Art

The flexible disk used in a 3.5-inch (90-mm) flexible disk cartridge and the like has a center hub fixed at the center thereof as a driving disk (see Japanese Unexamined Utility Model Publication No. 4-45382). This center hub is composed of a central and flange portions stepped with respect to each other, and the central portion has a central hole and drive hole formed therein.

At the center hub/adhesive ring attaching step in the flexible disk cartridge manufacturing process, an adhesive ring is attached to the flange portion of the center hub, and at the center hub/disk attaching step, a flexible disk is attached to the center hub by the adhesive ring.

In such a manufacturing process, the center hub must be picked-up and brought to predetermined positions (namely, to an adhesive ring on a center hub/adhesive ring attaching rotor and to a flexible disk on a center hub/disk attaching rotor), and for this purpose, a picking-up apparatus that uses a vacuum to pick-up the center hub is used.

The conventional center hub picking apparatus, however, picks-up the center hub by a vacuum suction only, and has no centering function, and therefore, the center hub cannot be attached to the adhesive ring, and therefore, the center hub cannot be attached to the adhesive ring, and then to the flexible disk, with a high precision.

SUMMARY OF THE INVENTION

An object of the present invention is to overcome the above-mentioned drawbacks of the conventional technique by providing a center hub picking-up apparatus and method by which the center hub can be picked-up correctly.

The above object is attained by providing a center hub picking-up apparatus comprising, according to the present invention, a spindle provided at the end thereof with a centering pin projecting into a central hole in the central portion of the center hub when the spindle is lowered, a collet chuck provided around the spindle and movable relative to the latter, and having end claws projecting into a concavity in the central portion of the center hub when the collet chuck is lowered, magnets buried in the outer end face portion of the collet chuck other than at the end claws, for attracting a flange portion of the center hub, and a mechanism for opening the collet chuck outwardly as the spindle is raised and pressing the chuck toward the circumferential wall of the concavity in the central portion of the center hub.

The above-mentioned apparatus according to the present invention operates as follows:

First, the picking-up apparatus (spindle and collet chuck) is brought to a position above a center hub, and then the spindle is lowered until the centering pin provided at the end thereof projects into the central hole in the central portion of the center hub, for a centering thereof.

Then the collet chuck is lowered until the end claws thereof project into the concavity in the central portion of the center hub. At this time, the flange portion of the center hub is raised by the attraction exerted by the magnets buried in the outer end face portion of the collet chuck other than at the end claws.

Next, the spindle is lifted, and the opening mechanism opens the collet chuck, the end claws of which will be, in turn, pressed toward the circumferential wall of the concavity in the central portion of the center hub, whereby the center hub is held in a desired position.

Thereafter, the entire picking-up apparatus is lifted and brought to predetermined positions, and the center hub then released by reversely following the above operation steps.

The collet chuck may be composed of a support slidably fitted on the spindle, a plurality of jaws supported at a plurality of circumferential positions of the support and oscillatable as a whole so that the diameter thereof enlarged and reduced, and a means of forcing the jaws in the diameter reducing direction.

Also, the forcing means may be formed by an elastic ring mounted in outer circumferential grooves on the jaws.

The opening mechanism may be made by diverging the outer circumferential end portion of the spindle, and thus, as the spindle is moved up relative to the collet chuck, the jaws of the latter are opened in the diameter enlarging direction.

According to another aspect of the present invention, a method of picking-up the flexible disk center hub is provided. This method consists of the following steps:

First, the spindle having a centering pin provided at the end thereof is lowered until the pin projects into the central hole in the central portion of a center hub.

Next, the collet chuck provided around the spindle and movable relative to the latter is lowered until the end claws of the collet chuck project into the concavity in the central portion of the center hub, while the flange portion of the center hub is attracted by the magnets buried in the outer end face portion of the collet chuck other than at the end claws.

Then the spindle is listed, and as it is raised up, the collet chuck is opened outwardly and the end claws are pressed toward the circumferential wall of the concavity in the central portion of the center hub, and thus the center hub is held in a desired position.

These and other objects and advantages of the present invention will be better understood from the ensuring description made by way of an example of an embodiment of the present invention, with reference to the drawings.

BRIEF DESCRIPTION OF THE DRAWINGS

FIGS. 8(a)-8(d) show the operation of the picking-up apparatus on the center hub/adhesive ring attaching rotor;

FIGS. 10(a)-10(e) show the operation of the picking-up apparatus on the center hub/disk attaching rotor;

DESCRIPTION OF THE PREFERRED EMBODIMENTS

Figure 11:
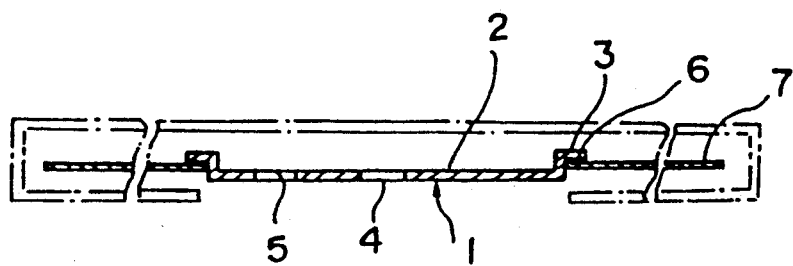
FIG. 11 is a sectional view of a flexible disk cartridge.

First, a flexible disk cartridge will be explained with reference to FIG. 11.

As shown, the flexible disk cartridge contains a combination of two major elements: a flexible disk 7 and a center hub 1. The center hub 1 is composed of a central portion 2 and flange portion 3 stepped with respect to each other; the central portion 2 having a central hole 4 and a drive hole 5 formed therein. The flexible disk 7 is secured along the inner circumference thereof to the flange portion 3 of the center hub 1 by an adhesive ring 6.

At the center hub/adhesive ring attaching step in the flexible disk cartridge manufacturing process, an adhesive ring 6 is attached to the flange portion 3 of the center hub 1, and at the center hub/disk attaching step, the flexible disk 7 is attached to the center hub 1 by the adhesive ring 6.

Next, the picking-up apparatus 10 for the center hub 1 will be described with reference to FIGS. 1 to 4.

The picking-up apparatus 10 according to the present invention comprises a spindle 11 having a centering pin 11a provided at the end thereof, and a collect chuck 12 provided around the spindle 11 and movable relative to the latter.

The collect chuck 12 is composed of a support 13 fitted on the spindle 11 by a slide bearing 13a, three jaws 14, and an O-ring as an elastic ring. Said jaws 14 are supported with pins 13b, respectively, at three circumferential positions 3 on the support 13, and oscillatable in the diameter enlarging and reducing directions. Said O-ring 15 is mounted on grooves formed in the outer ends of the respective jaws 14, to urge the jaws 14 in the diameter reducing direction.

Each of the jaws 14 has a projecting claw 14a provided at the end (bottom end) thereof, and a magnet 16 buried in the outer end face portion thereof other than the claw 14a.

Further, the spindle 11 has a divergent portion 17, as an opening mechanism, on the outer circumference of the end portion thereof. As the spindle 11 is moved up relative to the collect chuck 12, the collect chuck 12 (jaws 14) are opened (the diameter thereof is enlarged) by the diverging portion 17.

The center hub is picked-up by the picking-up apparatus according to the present invention as described below:

First, the picking-up apparatus 10 (spindle 11 and collect chuck 12) is brought to a position above the center hub 1 (FIG. 1(a)), and then the spindle 11 is lowered until the centering pin 11a provided at the end thereof projects into the central hole 4 in the central portion of the center hub for centering (FIG. 1(b)).

Then, the collect chuck 12 is lowered until the end claws 14a of the jaws 14 thereof projected into the concavity in the central portion 2 of the center hub 1. At this time, the flange portion 3 of the center hub 1 is raised by the attraction exerted by the magnets 16 buried in the outer end face portions of the jaws 14 other than at the end claws 14a (FIG. 1(c)).

Next, the spindle 11 is lifted, and the diverging portion 17 of the spindle 11 acts on the jaws 14 of the collect chuck 12 to open the jaws 14, the end claws 14a of which will be, in turn, pressed toward the circumferential wall of the concavity in the central portion 2 of the center hub, and thus the center hub 1 is held in the desired position (FIG. 1(d)).

Thereafter, the entire picking-up apparatus is lifted as a whole and brought to predetermined positions, and the center hub 1 is released by reversely following the above operation steps.

The center hub/adhesive ring attaching step and center hub/disk attaching step, at each of which the picking-up apparatus 10 according to the present invention is used, will be described below.

Figure 1:
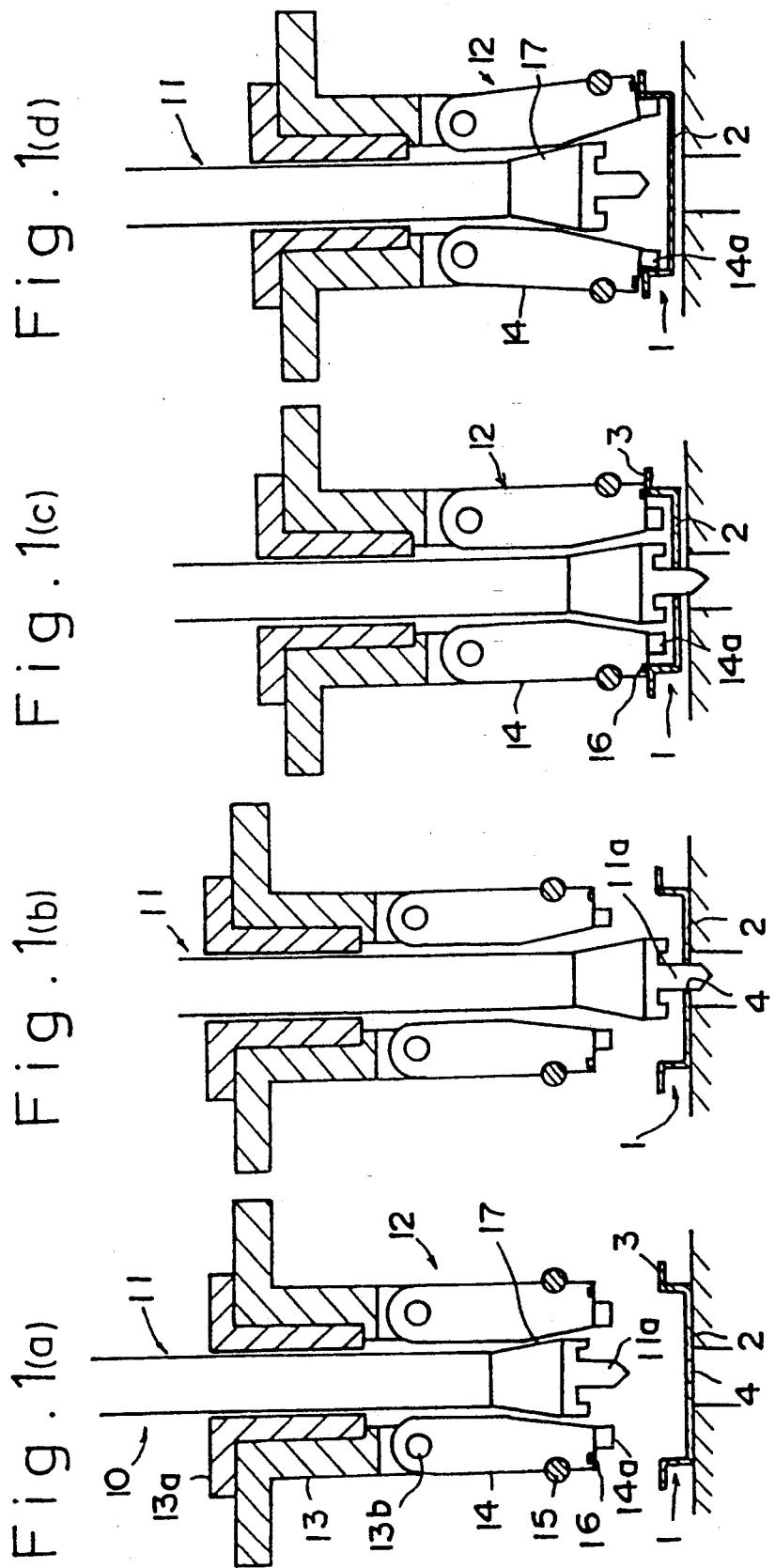
FIGS. 1(a)–1(d) show the illustrate operation of the picking-up apparatus according to one embodiment of the present invention.
Figure 2:
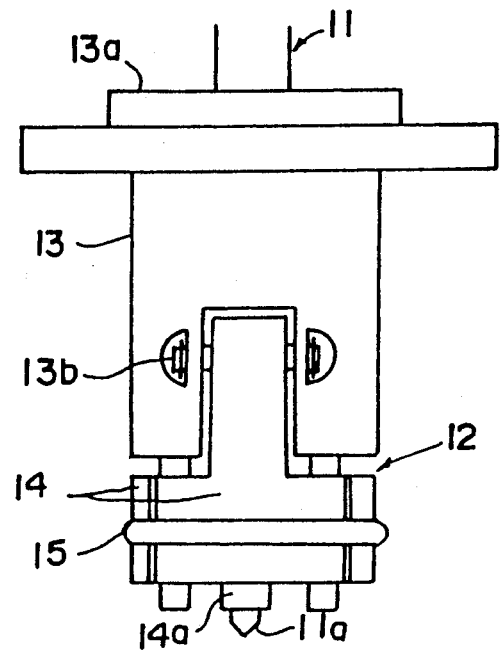
FIG. 2 is a front view of the picking-up apparatus.
Figure 3:
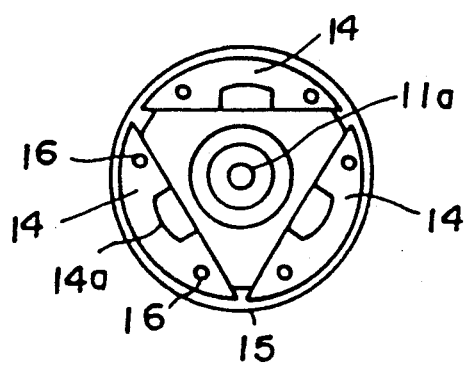
FIG. 3 is a bottom view of the picking-up apparatus.
Figure 4:
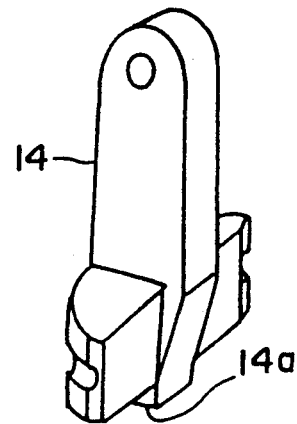
FIG. 4 is a perspective view of the jaws.
Figure 5:
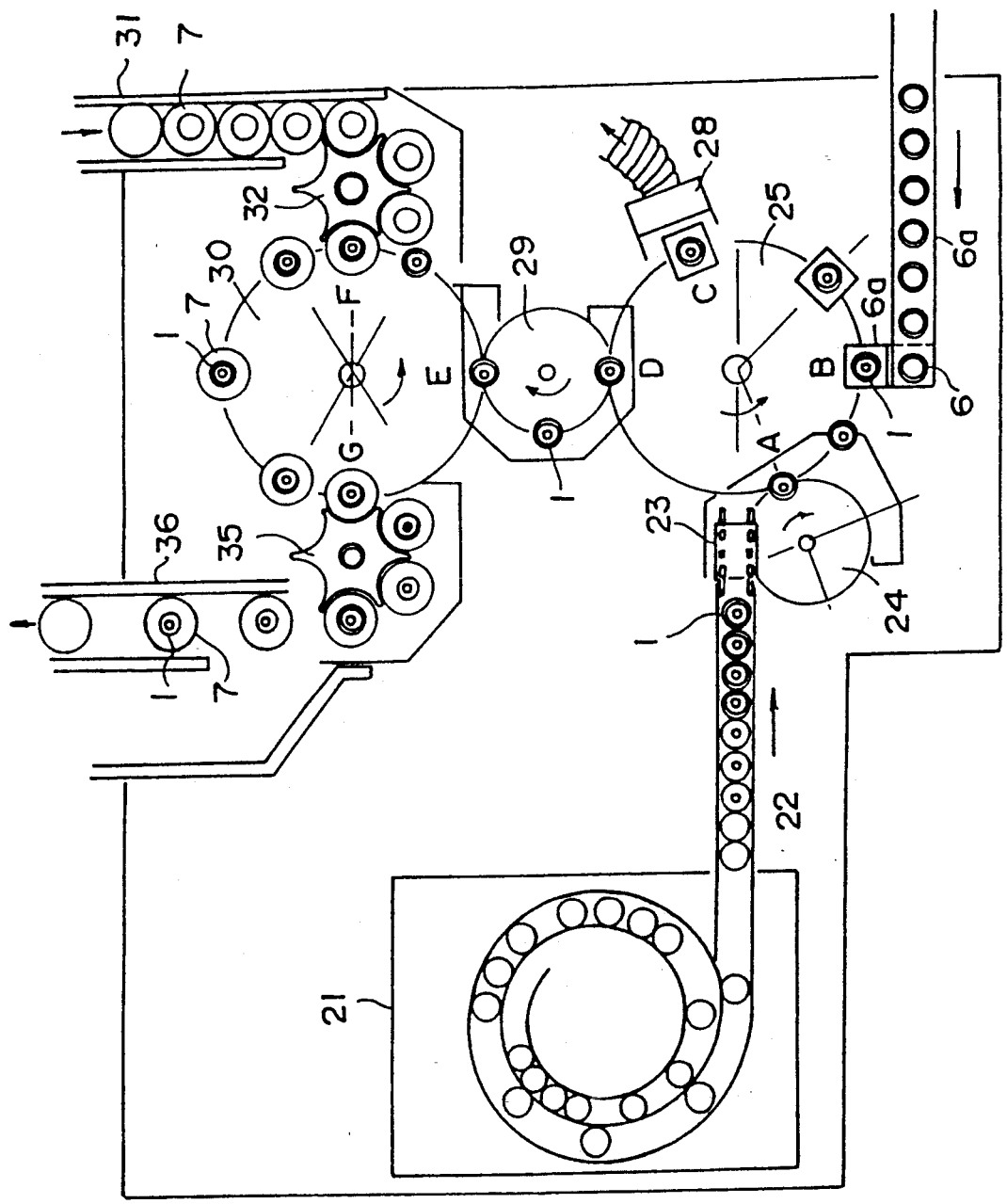
FIG. 5 shows the picking-up apparatus when installed.

FIG. 5 shows the picking-up apparatus 10 used in these steps.

The picking-up apparatus 10 according to the present invention is provided at each of the index positions of a center hub/adhesive ring attaching rotor 15, and at each of the index positions of a center hub/disk attaching rotor 10 (10-1 and 10-2).

Figure 6:
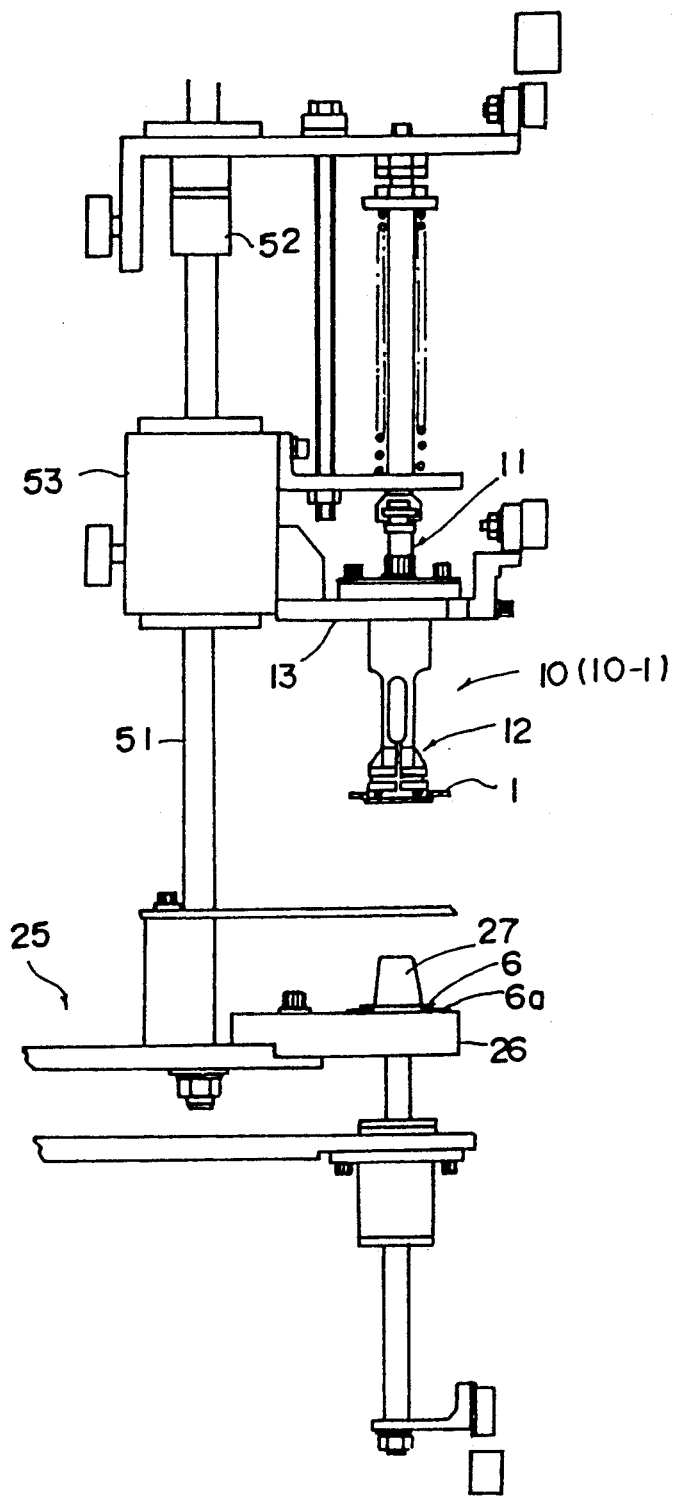
FIG. 6 shows the picking-up apparatus operating in the center hub/adhesive ring attaching step and center hub/disk attaching step of the flexible disk cartridge manufacturing process.

As seen from an example of the picking-up apparatus 10 installed on the center hub/adhesive ring attaching rotor 25 shown in FIG. 6, the spindle 11 of the picking-up apparatus 10 is coupled to a first slider 52 provided vertically movably on a guide rod 51 erected at each of the index positions of the rotor 25, and the support 12 of the collect chuck 12 is coupled to a second slider 53 also provided vertically movably on the guide rod 51. Thus the spindle 11 and collet chuck 23 are vertically moved while being rotated together with the rotor 25.

Figure 7:
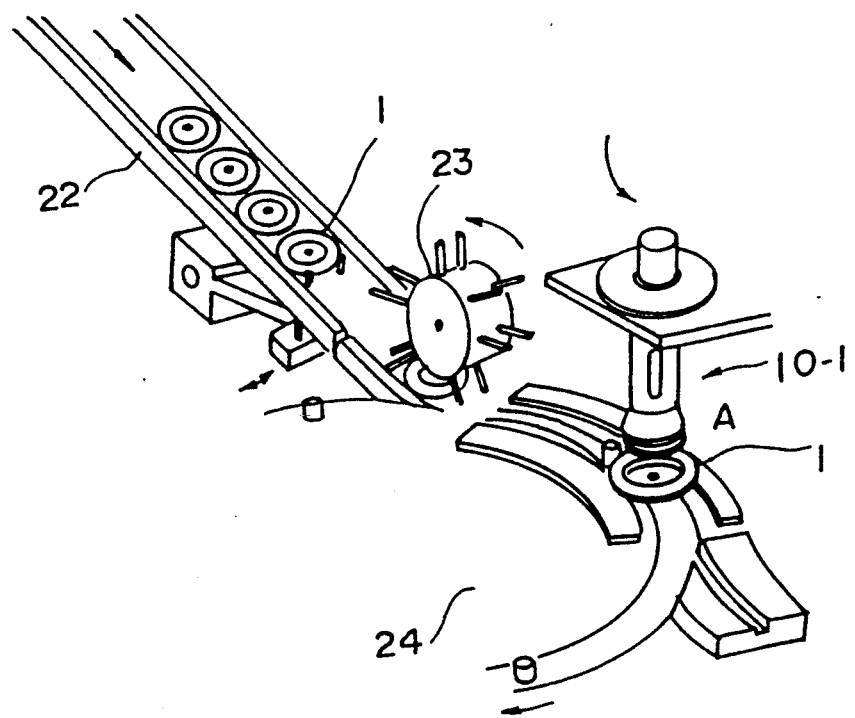
FIG. 7 is a perspective view of a first transfer rotor.

As shown in FIG. 5, center hubs 1 supplied from a part feeder drop on a chute 22 and are passed one by one to a first transfer rotor 24 by a feed gear 23. The center hub 1 is transferred by the first transfer rotor 24 to a position a on the center hub/adhesive ring attaching rotor 25, at which it will be picked-up by the picking-up apparatus (10-1) (FIG. 7).

Then the picking-up apparatus 10-1 is rotated through a predetermined angle, together with the rotor 25, to a position B.

Further, the adhesive rings 6 are attached to a tapelike base sheet (release sheet) 6a, but one by one by a cutter (not shown), carried to the position B on the center hub/adhesive ring attaching rotor 25, and placed on a table 26 (FIG. 8(a)).

The center hub 1 and adhesive ring 6 are attached to each other at the center hub/adhesive ring attaching rotor 15 as described below.

First, a conical adhesive ring centering pin 27 is projected from the table 26, to center the adhesive ring 6 (FIG. 8(b) and FIG. 6), and then the picking-up apparatus 10-1 is lowered as a whole and attached to the center hub 1 by the adhesive ring 6, by exerting a pressure thereon (FIG. 8(c)), and thereafter, transports the center hub 1 and adhesive ring 6 as attached to each other (FIG. 8(d)). The base sheet 6a is drawn out of the system at a position C on the rotor 25 by a suction device 28.

The picking-up apparatus 10-1 releases the center hub 1 (with the adhesive ring 6) at a position D on the rotor 25, and passes it to a second transfer rotor 29.

Figure 9:
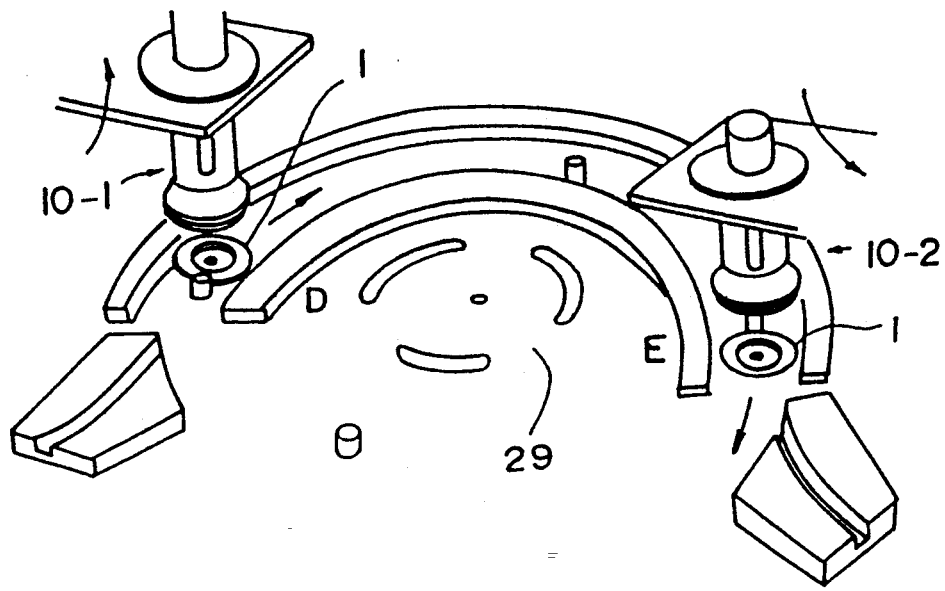
FIG. 9 is a perspective view of a second transfer rotor.

Then, the center hub 1 (with the adhesive ring 6) is passes to a position E on a center hub/disk attaching rotor 30 by the second transfer rotor 29, at which it will be picked-up by another picking-up apparatus 10-2 (FIG. 9).

The picking-up apparatus 10-2 is rotated through a predetermined angle, together with the rotor 30, to a position F.

Further, the flexible disks 7 are carried, one by one, along a guide way 31 from a pallet inlet by a feed gear 32, to the position F on the center hub/disk attaching rotor 30 and placed on a table 33 (FIG. 10(a)).

The center hub 1 (with the adhesive ring 6) and the flexible disk 7 are attached to each other at the center hub/disk attaching rotor 30 as described below.

First, a lifting member 34 is projected from the table 33 to lift the flexible disk 7 (FIGS. 10(b) and 10(c)), and then the picking-up apparatus 10-2 is lowered as a whole and pushed down on the lifting member 34, to thus attach the flange portion 3 (on which the adhesive ring 6 is attached) of the center hub 1 to the flexible disk 7 by exerting a pressure thereon (FIG. 10(d)). Thereafter the picking-up apparatus 10-2 releases the center hub 1 and is raised up, while the center hub 1 and flexible disk 7 are left on the table 33 (FIG. 10(e)).

When the center hub/disk attaching rotor 30 is rotated to a position G, the flexible disks 7 (each with the center hub 1) on the rotor 30 are taken out one by one by a feed gear 35, fed along a guide way 36 to a pallet outlet, and delivered to a next step in the flexible disk cartridge manufacturing process.

As described above, the piking-up apparatus and method according to the present invention can pick-up the flexible disk center hubs correctly while centering same, for attaching the center hub to the adhesive ring and the center hub to the flexible disk with a high precision.

We claim:

1. A center hub picking-up method used in manufacturing a flexible disk cartridge, the flexible disk cartridge containing a combination of a flexible disk and a center hub, the center hub having central and flange portions stepped with respect to each other, comprising the steps of:

first lowering a spindle having a centering pin provided at an end thereof until said pin projects into a central hole in the central portion of said center hub;

next lowering a collect chuck provided around said spindle movable relative to the latter until end claws of said collet chuck project into a concavity in the central portion of said center hub, while attracting said flange portion of said center hub by magnets buried in the outer end face portion of said collet chuck other than at said end claws; and then lifting said spindle, opening said collet chuck outwardly as said spindle rises, and pressing said end claws toward the circumferential wall of said concavity in the central portion of said center hub to thereby hold said center hub in a required position.

* * * * *

UNITED STATES PATENT AND TRADEMARK OFFICE
CERTIFICATE OF CORRECTION

Page 1 of 2

PATENT NO. : 5,303,939
DATED : April 19, 1994
INVENTOR(S) : Tsutomu AKASHI and Shuichi IMADA It is certified that error appears in the above-indentified patent and that said Letters Patent is hereby corrected as shown below:

In column 3, line 34, after 'a' delete "collect" and insert --collet--.

In column 3, line 37, after 'The' delete "collect" and insert --collet--.

In column 3, line 53, after the first occurence of 'the' delete "collect" and insert --collet--.

In column 3, line 53, after the second occurence of 'the' delete "collect" and insert --collet--.

In column 3, line 60, before 'chuck' delete "collect" and insert --collet--.

In column 3, line 65, after the first occurence of 'the' delete "collect" and insert --collet--.

In column 4, lines 5-6, before 'chuck' delete "collect" and insert --collet--.

UNITED STATES PATENT AND TRADEMARK OFFICE
CERTIFICATE OF CORRECTION

PATENT NO.   : 5,303,939
DATED        : April 19, 1994
INVENTOR(S)  : Tsutomu AKASHI and Shuichi IMADA It is certified that error appears in the above-indentified patent and that said Letters Patent is hereby corrected as shown below:

In column 4, line 32, after 'the' delete "collect" and insert --collet--.

In column 6, line 18, Claim 1, after 'a' delete "collect" and insert --collet--.

Signed and Sealed this

Twenty-seventh Day of August, 1996

Attest:

BRUCE LEHMAN

Attesting Officer     Commissioner of Patents and Trademarks